(12) United States Patent
Vosseler et al.

(10) Patent No.: US 6,941,367 B2
(45) Date of Patent: Sep. 6, 2005

(54) SYSTEM FOR MONITORING RELEVANT EVENTS BY COMPARING MESSAGE RELATION KEY

(75) Inventors: Frank Vosseler, Altdorf (DE); Martin Recker, Benningen (DE)

(73) Assignee: Hewlett-Packard Development Company, L.P., Houston, TX (US)

( * ) Notice: Subject to any disclaimer, the term of this patent is extended or adjusted under 35 U.S.C. 154(b) by 753 days.

(21) Appl. No.: 09/853,103

(22) Filed: May 10, 2001

(65) Prior Publication Data

US 2002/0169870 A1 Nov. 14, 2002

(51) Int. Cl.[7] .......................................... G06F 15/173
(52) U.S. Cl. ..................... 709/224; 709/223; 714/39
(58) Field of Search ............................. 709/223, 224; 714/48, 47, 39; 719/318; 712/244; 707/201, 1; 711/147

(56) References Cited

U.S. PATENT DOCUMENTS

| | | | | | |
|---|---|---|---|---|---|
| 5,592,664 | A | * | 1/1997 | Starkey ......................... | 707/1 |
| 5,941,996 | A | * | 8/1999 | Smith et al. ................... | 714/47 |
| 5,949,759 | A | | 9/1999 | Cretegny et al. ............. | 370/250 |
| 6,006,016 | A | * | 12/1999 | Faigon et al. ................. | 714/48 |
| 6,108,700 | A | | 8/2000 | Maccabee et al. ........... | 709/224 |
| 6,182,157 | B1 | * | 1/2001 | Schlener et al. ............. | 719/318 |
| 6,253,243 | B1 | * | 6/2001 | Spencer ....................... | 709/224 |
| 6,336,184 | B1 | * | 1/2002 | Burke et al. ................. | 712/244 |
| 6,347,362 | B1 | * | 2/2002 | Schoinas et al. ............. | 711/147 |
| 6,507,852 | B1 | * | 1/2003 | Dempsey et al. ............ | 707/201 |
| 6,721,791 | B1 | * | 4/2004 | Qiao ............................ | 709/224 |

OTHER PUBLICATIONS

European Search Report of European Patent Application No. 01 111 444.4 dated Oct. 11, 2001 English.
VantagePoint for Windows, Concepts Guide, HP Openview, 2000, pp. 1–79 English.
VantagePoint for Windows, Concepts Guide, HP OpenView, 2000, pp. 1–79, Engish.

* cited by examiner

Primary Examiner—Le Hien Luu

(57) ABSTRACT

The invention is directed to a method for monitoring objects within an information technological (IT) network having monitored nodes in which monitoring-relevant events occurs comprising: generating event-related messages comprising a message key and a message relation key; comparing the message relation key with the message key of another message; processing the other message depending on the result of the comparison. The invention is also directed to a corresponding system and computer program product.

23 Claims, 6 Drawing Sheets

FIG.3

Threshold violation of disk utilisation:

Metric name: disk_util
Object name: /opt
Node name: trex
Threshold Level: 95

Message Key pattern: disk_util: <$MSG_OBJECT>:<$MSG_NODENAME>:95  ← 6b
Message Key: disk_util: /opt: trex: 95  ← 10b
Msg. relation Key pattern: disk_util: <$MSG_OBJECT>: <$MSG_NODENAME:<*>>  ← 6c
Msg. relation Key: disk_util: /opt: trex: <*>  ← 10c

FIG.4 disk_util: /opt: trex:   <*>
------------------------------
disk_util: /opt: trex:    75
disk_util: /opt: frankv: 95

1: disk_util: /opt: trex: 75   — 10b'
2: disk_util: /frankv:    95   — 10b"

FIG.5b

1: disk_util: /opt: trex: 95   — 10b
2: disk_util: /frankv:    95   — 10b"

SYSTEM FOR MONITORING RELEVANT EVENTS BY COMPARING MESSAGE RELATION KEY

FIELD OF THE INVENTION

The present invention relates generally to the monitoring of an information technological (IT) network, and more particularly to a method, system and a computer program product for monitoring objects in an IT network.

BACKGROUND OF THE INVENTION

Nowadays, as information systems become ubiquitous, and companies and organisations of all sectors become drastically dependent on their computing resources, the requirement for the availability of the hardware and software components of an IT network and of services based on it, (hereinafter all three are generally referred to as "objects") is increasing while the complexity of IT networks is growing.

There are monitoring systems available, which enable the availability and performance of objects within an IT network to be monitored and managed.

For example, Hewlett-Packard offers such a product under the name "OpenView VantagePoint". A personal computer, server, network interconnecting device or any system with a CPU is called a node. The nodes of an IT network monitored by such a monitoring system are called monitored nodes. On a monitored node, a program or process runs as a background job which monitors the occurrence of certain events (e.g. error messages) at the node and generates event-related messages according to rules which can be defined by a user. Such a program or process is called an "agent". An agent is not limited to passive monitoring, e.g. by collecting error messages. Rather, it can carry out active monitoring of hardware and processes. For example, an agent can periodically (e.g. every five minutes) send requests to a process (e.g. an Oracle process) to find out whether the process is still active. A response saying that the process is no more active (or the absence of a response) may also constitute an "event". The messages generated by the agents are collected by a monitoring server which stores and processes them and routes the processing results to a monitoring console by means of which an IT administrator or operator can view the status and/or performance of the IT objects.

A monitoring system of that kind increases the availability of the IT objects under consideration since it enables a fault or failure of a component of the monitored network to be quickly detected so that a repair action or the like can immediately be started.

In such a known monitoring system, the operator is often overwhelmed with a large number of messages which are displayed at the monitoring console. Some of these messages are related to others, for example, when an application goes down and starts up again. Another example of related messages is the case in which a network router goes down so that all nodes beyond the router can no more be reached. As a consequence, the agent associated with the router will not only send messages indicating that the router is down, but will also send a larger number of messages that the nodes beyond the router are not available. Another fraction of the large number of messages sent to the monitoring console are messages which report similar or identical events, for example three messages reporting that a user switches to user root three times. Another fraction of messages report how a problem situation evolves with time, for example, how the amount of free disk space decreases or increases on a monitored node.

In some monitoring systems, messages can be correlated in order to suppress redundant messages, such as messages reporting identical events or the evolution of a problem situation. This is achieved by a kind of superordinate correlation analysis which is carried out by the monitoring server. However, the definition of this correlation analysis which has to be provided by the user, is rather complicated. Further, the correlation analysis requires considerable computing and database access resources. A correlation of messages is not always possible since the available messages do not always contain the full information required for a correlation check.

Therefore, a monitoring system is desirable in which identical or related events can be more easily suppressed.

SUMMARY OF THE INVENTION

The invention provides a method for monitoring objects within an information technological (IT) network having monitored nodes in which monitoring-relevant events occur. The method comprises: generating event-related messages comprising a message key and a message relation key; comparing the message relation key with the message key of another message; and processing the other message depending on the result of the comparison.

According to another aspect, the invention provides a system for monitoring objects within an IT network having monitored nodes in which monitoring-relevant events occur, and a message processor. Agents are associated with the monitored nodes and generate event-related messages which comprise a message key and a message relation key. The message processor compares the message relation key with the message key of another message and processes the other message depending on the result of the comparison.

According to still another aspect, the invention is directed to a computer program product including program code for execution on a network having monitored nodes in which monitoring-relevant events occur. The computer program product comprises said program code for: generating event-related messages comprising a message key and a message relation key; comparing the message relation key with the message key of another message; and processing the other message depending on the result of the comparison.

According to yet another aspect, the invention is directed to a computer program product including program code for execution on a network having monitored nodes in which monitoring-relevant events occur. The program code generates event-related messages comprising a message key and a message relation key for a comparison of the message relation key with the message key of another message. The message key and the message relation key are generated according to key patterns which can be defined on the basis of a set of pattern definition rules, and wherein both the message key pattern and the message relation key pattern are defined on the basis of the same set of pattern definition rules.

Other features are inherent in the disclosed system, computer program product and method or will become apparent to those skilled in the art from the following detailed description of embodiments and its accompanying drawings.

DESCRIPTION OF THE DRAWINGS

In the accompanying drawings:

FIG. 3 illustrates the generation of a message with a message key and a message relation key;

FIG. 4 illustrates how the message of FIG. 3 is compared with other messages

FIGS. 5a, b show an exemplary view of message keys displayed in a message browser before and after the comparison carried out according to FIG. 4;

DESCRIPTION OF THE PREFERRED EMBODIMENTS

Figure 1:
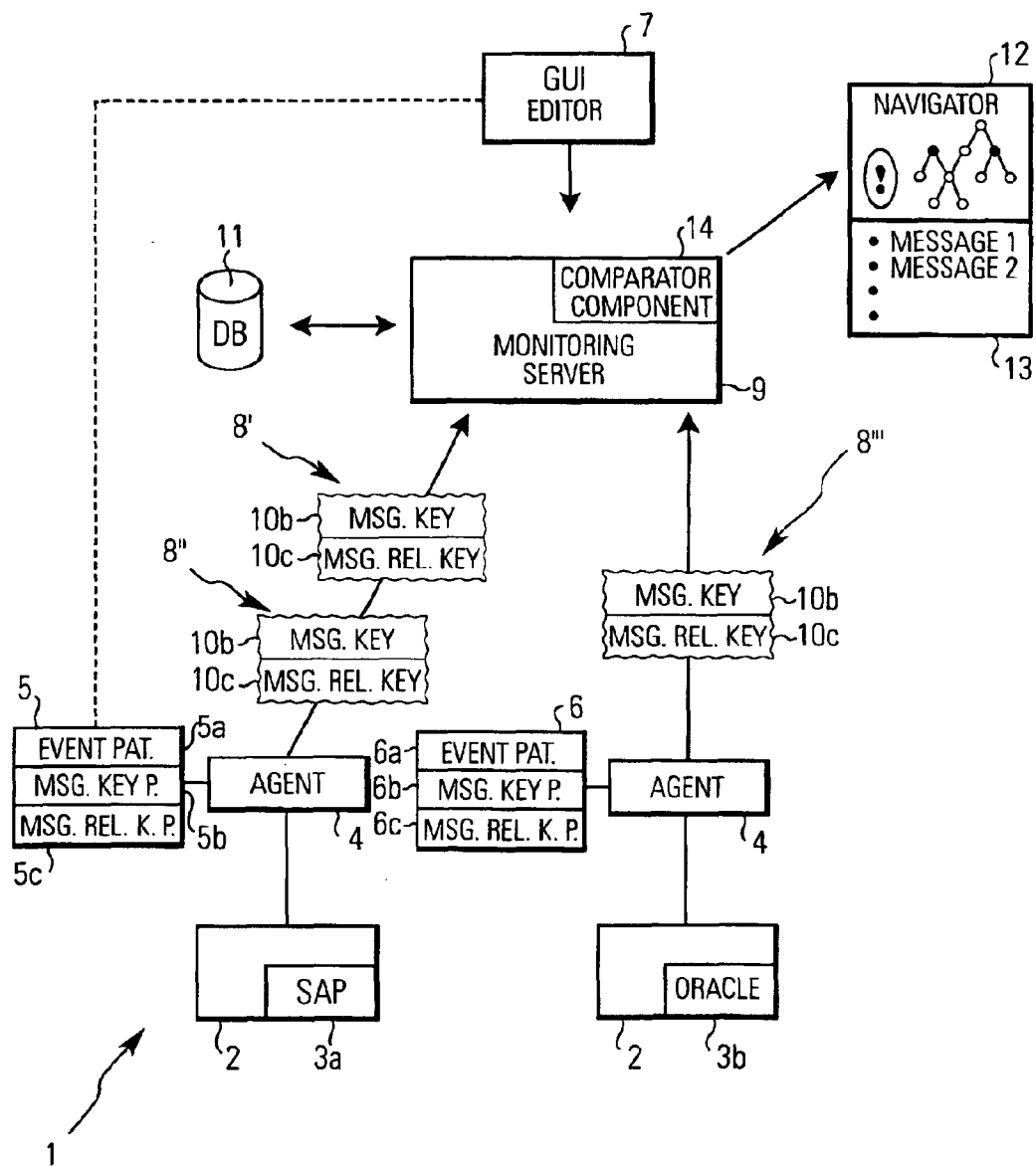
FIG. 1 shows a high-level architecture diagram of a monitored IT network.

FIG. 1 shows a high-level architecture diagram of a preferred embodiment. Before proceeding further with the description, however, a few items of the preferred embodiments will be discussed.

In the preferred embodiments, objects of an IT network are automatically monitored as to their availability and performance by a monitoring system. Such monitored objects comprise hardware devices, software and services. A node is a network object such as a PC, server or any system with a CPU. A node is called a "monitored node" if it and/or applications or processes running on it are monitored by the monitoring system. Services are, for example, customer-based or user-oriented capabilities provided by one or more hardware or software components within a computing environment. For instance, services can be commercial applications (such as Oracle), Internet server applications (such as Microsoft Exchange), or the internal Windows NT 2000 services.

The monitoring may comprise passive monitoring (e.g. collecting error messages produced by the objects) or active monitoring (e.g. by periodically sending a request to the object and checking whether it responds and, if applicable, analysing the contents of the response). Besides pure monitoring tasks, in the preferred embodiments the monitoring system can also carry out management tasks, such as error correcting or fixing tasks, setting tasks and other network services control tasks.

An event is a (generally unsolicited) notification, such as an SNMP trap, CMIP notification or TL1 event, generated e.g. by a process in a monitored object or by a user action or by an agent. Typically, an event represents an error, a fault, change in status or performance, threshold violation, or a problem in operation. For example, when a printer's paper tray is empty, the status of the printer changes. This change results in an event.

An agent is a program or process running on a remote device or computer system that responds to monitoring or management requests, performs monitoring or management operations and/or sends event notification. In the preferred embodiments, the agents are designed to run on the monitored nodes. Preferably, there is one agent for each monitored node. If several applications or processes run on the same monitored node, they will be preferably monitored by one and the same agent associated with this node. The agent is configured by a set of specifications and rules for each application or process to be monitored. The rules tell the agent what to look for and what to do when an event occurs (and, what events to trigger, if the agent carries out active monitoring). For example, according to particular rules, an agent filters events and generates messages which inform the monitoring server about the occurrence of certain events and/or the status and performance of the monitored application or process. In the preferred embodiments, the message processor is a part of the monitoring server. The monitoring server collects event and performance data, processes them and routes the messages and the results to a monitoring console (an user interface). In the preferred embodiments, services are monitored platform-independently. For example, different operating systems can be implemented on the various monitored nodes.

In the preferred embodiments, the generated event-related messages comprise what is called a message key. Preferably, a message key has attributes which characterise certain characteristics of the event that triggered that message, in particular those event characteristics which are interesting for monitoring purposes. For example, if the event is an entry in a logfile of a hardware device, the message key of the event includes only that part of the logfile entry which is considered relevant for the monitoring process. Thus, the message key generation can represent a data filtering which removes irrelevant event information. However, which data are actually included in the message key can be freely chosen by the user through the definition of a message key generation rule which is called message key pattern.

Further, at least some of the generated messages comprise what is called a message relation key. The message relation key is an indication of which other messages (which are previously generated messages, simultaneously or subsequently generated messages) are related to the present message. The generation of the message relation key can also be defined by the user by means of a message relation key pattern.

The message relation key can be identical with the message key. In this case, only identical messages are considered as related to the present message. However, preferably the message relation key has at least one attribute which is a placeholder symbol (a wildcard). Such a wildcard leaves open the specific value of the data appearing at the position of the wildcard. Thus, a message relation key with a wildcard relates the present event to a class of other preferably previous events which are identical in the message relation key's attribute except the wildcard, but may differ from it in the attribute which is represented by the wildcard. For example, if a message key reports the fraction of available disk space of a particular hardware device, a message relation key with a wildcard at the available-disk-space-friction parameter relates the present message to all previous messages which reported the available disk space of that hardware device (irrespective of the concrete fraction value which was specified in those previous messages.

In the preferred embodiments, the message relation key of the present message is compared with the message keys of other, e.g. previous messages. Preferably, the comparison is a check as to whether the message relation key of the present message and the message key of the other message match with each other of course, taking into account possible wildcards in the sense explained above.

The further processing of the other messages depends on the result of the comparison. In the preferred embodiments, the other message is discarded if it is found that its message key matches with the message relation key of the present message (of course, taking into account possible wildcards). Alternatively, rather than discarding previous related messages, the finding of a message correlation can be used for grouping messages together, weighting correlated messages in a particular way, displaying them in a particular way etc.

In the preferred embodiments, at least one monitoring agent is associated with a monitored node and generates the event-related messages comprising the message key. If the messages comprise also a message relation key, it is also generated by the agent. This is in contrast to common correlation methods in which relations between individual events (e.g. messages) are evaluated on a level above the generation of the individual events (e.g. at a monitoring server). In the present preferred embodiments, however, the correlation rule is entered at the lower level of the individual message generation and is transformed there into a message-specific message relation key. At the higher level (e.g. at the monitoring server), only a simple comparison between the message relation key and the other messages is carried out.

In the preferred embodiments, the message key and the message relation key are generated according to key patterns. A key pattern is a general rule specifying whether a message key is to be generated and which event-data are to be included into the message key or message relation key. Such key patterns can be defined by a user on the basis of a set of available pattern definition rules, which is, for example, similar to a script program which can be defined on the basis of a set of available script definition rules. Both the message key pattern and the message relation key pattern are defined on the basis of the same set of pattern definition rules i.e. on the same syntax. In contrast, in solutions in which the message key generation and the correlation analysis are performed on different levels and are therefore logically different, the definition of key patterns and relations patterns would rely on different definition rules.

Further, in such solutions, the user would have to define the message key patterns and the correlation patterns at completely different places of the monitoring computer program. In contrast, in the preferred embodiments the message key pattern and the message relation key pattern can be defined by the user via a user interface at a common place of the monitoring computer program, since both patterns are used for the message key and message relation key generation by one and the same agent.

The preferred embodiments of the computer program product comprise digital program code which, for example, is stored on a computer-readable data carrier or is in the form of signals transmitted over a computer network. The preferred embodiments of the program code are written in an object-oriented programming language (e.g. Java or C++). The program code can be loaded (if needed, after compilation) and executed in a computer or in networked computers, e.g. a monitoring server networked with monitored servers.

Returning now to FIG. 1, it shows a high-level architecture diagram of a preferred embodiment of a monitoring system 1. The system 1 comprises monitored nodes 2, for example server computers on which applications 3, such as SAP™ 3a or Oracle™ 3b, run. The servers 2 are nodes of a monitored IT network, the network itself and the network interconnects are not shown in FIG. 1. The applications 3a, 3b may run on different platforms with different operating systems forming a heterogeneous network. A monitoring software component 4 (an "agent") is installed on each of the monitored servers 2 which runs automatically as a background task. The agents 4 receive event notifications and collect performance data from the monitored applications 3a, 3b and from hardware resources (server computers 2) used by them. They collect and evaluate these event notifications and performance data according to rules 5, 6. The rules comprise event patterns 5a, 6a, message key patterns 5b, 6b and message relation key patterns 5c, 6c which are defined by a user via a graphical user interface (GUI) 7.

Depending on which events occur and what is indicated by the event patterns 5a, 6a and message key patterns 5b, 6b, the agents 4 filter the event data and generate monitoring messages 8', 8", 8''' according to the message key patterns 5b, 6b, and send the monitoring messages 8', 8", 8''' to a message processor, here a monitoring server 9. The messages 8 comprise a message key 10b which is generated by the corresponding agent 4 according to what is prescribed by the corresponding message key pattern 5b, 6b. Messages 8 which are to be correlated with previous messages further comprise a message relation key 10c which is generated by the corresponding agent 4 according to what is prescribed by the corresponding message relation key pattern 5c, 6c. The monitoring server 9 stores the messages in a monitoring database 11, processes them and sends the messages and the processing results to a navigator display 12 including a message browser 13. In the navigator display 12, the network and the services provided by it are visualised for the user in the form of a two-dimensional network and service map showing the status of the individual monitored services. In the message browser 13 the messages are displayed.

The monitoring server 9 comprises a comparator component 14 which compares the message relation key 10c of a newly incoming message 8 with the message keys 10b of all previous messages displayed at the message browser 13. If it finds a match between the message relation key 10c and a message key 10b of a previous message, it discards the previous message from being displayed at the message browser 13. However, the newly incoming message is sent to and displayed at the message browser 13 so that it effectively replaces the matching previous message. The network map in the navigator display 12 is automatically updated so that it reflects a status which corresponds to the newly incoming message rather than to the matching discarded message. In other embodiments, the comparison and discarding of messages can likewise be locally performed at the message browser.

In some of the preferred embodiments, messages are only discarded from the message browser 13, but the database 11 keeps full record of all messages. In other embodiments, messages are also discarded from the database 11.

As will be explained in more detail below, the correlation of different messages can be freely defined by the particular choice of the message relation key pattern 5c, 6c and therefore, does not necessarily need to correlate identical messages (although it enables this to be done). Preferably, a separate mechanism for the suppression of duplicate events is provided. Since generally duplicates events originate from the same agent 4, the suppression of duplicate events can be carried out on the level of the agents 4. To this end, an agent 4 stores the last message it has generated and forwarded to the monitoring server 9. If the next message turns out to be identical with the stored previous message, it is not forwarded to a monitoring server 9. However, in other embodiments the agent 4 forwards also duplicate messages to the monitoring server 9 for counting purposes. The duplicate messages are then identified and discarded by the monitoring server 9. In each case, the identification of duplicate events can be based on a simple identity check and does not require a comparison of a message relation key with the message keys of previous messages, as is the case with the general correlation mechanism which is explained in more detail below.

Figure 2:
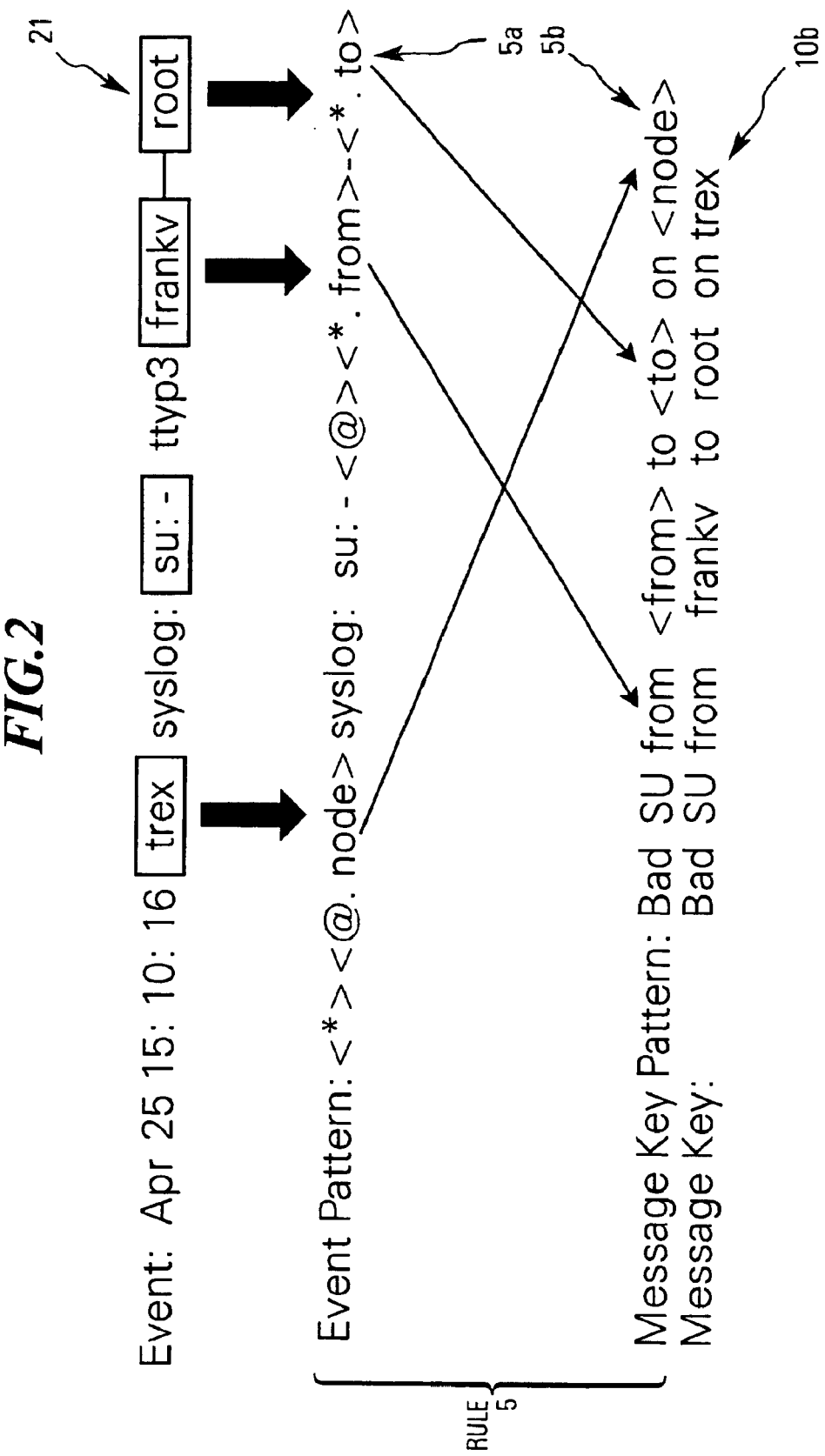
FIG. 2 shows an example of an event, an event pattern and a message key pattern, and a message key

FIG. 2 illustrates the generation of a message key by means of an example. The exemplary event is a bad "Switch User" (SU) which has appeared on a node named "trex" from "frankv" to "root". This event shows up in a logfile as a syslog entry 21 as indicated in FIG. 2. Apart from the data "SU:-" (which means "bad SU"), "trex", "frankv" and "root", the logfile entry 21 carries a date and time indication, a terminal type indication ("ttyp3") and a "syslog" indication.

Rules 5 define whether and how a message key 10b is generated from the logfile entry 21. The rules 5 comprise an event pattern 5a and a message key pattern 5b if a message is to be correlated with other messages, the rules will further comprise a message relation key pattern. This is explained in connection with FIG. 3. The event pattern 5a has two functions: 1. It represents an IF clause since it requires the logfile entry to be a "syslog" entry, and that a bad switch user (i.e. "SU : -") has appeared. Only if this condition is met, a message key 10b and, thus, a message 8 is generated; 2. It defines that the data appearing at the places of the expressions <. node ><*.from> and <*.to > are assigned the variable names "node", "from" and "to". The message key pattern 5b represents a clause, i.e. it defines how a message key 10b is generated from the logfile entry 21, provided of course that the condition defined by the IF clause is met. In the example of FIG. 2, the pattern message key 5b comprises text "bad SU from . . . to . . . on . . . " and indicates that the values of the variables "from", "to" and "node" have to be inserted in the text. It does not include event data which are considered irrelevant, such as the date and time indication, the syslog indication and the terminal type indication. As a result, the message key 10b "Bad SU from frankv to root on trex) is generated. Thus, the message key generation includes filtering data (since a message key is only generated if the logfile entry 21 matches the event pattern 5a) as well as condensing data, since irrelevant event data are not included in the message key 10b.

In the example of FIG. 3, the event to be reported by a message is a violation of a threshold on disk utilisation. In the present example, the threshold level is set to 95%. Thus, an event occurs if the utilisation of a disk exceeds 95%. The message key pattern 6b comprises the text "disk_util:/ . . . : . . . :95". If the threshold violation occurs in an object/opt on a node trex, the corresponding variable data are inserted into the text and the generated message key 10b reads: "disk_util:/opt:trex:95".

An example of a message relation key pattern 6c is also shown in FIG. 3. The purpose of the message relation key pattern 6c is that all previous disk-utilisation-related messages referring to the same object and node shall be correlated with the present message, irrespective of their threshold level. Therefore, the message relation key pattern 6c is identical with the message key pattern 6b, apart from a wildcard (<* >) in place of the particular threshold level "95". Consequently, the message relation key 10c which is generated according to the message relation key pattern 6c is identical with the message key 10b, apart from a wildcard replacing the particular threshold level. Thus, it reads for the exemplary event: disk_util:/opt:trex: <* >.

The message key 10b and the message relation key 10c are then sent from the agent 4 to the monitoring server 9. As illustrated in FIG. 4, the monitoring server's comparator component 14 compares the present message relation key 10c with all previous message keys 10b',10b" which are displayed in the message browser 13. In the example shown in FIG. 4, there is a previous disk-utilisation message key 10b' from node trex which indicates that the disk utilisation has been 75%. This message is now outdated, since the disk utilisation on this node is now above the threshold of 95%. The message key 10b' matches with the message relation key 10c of the present message. In particular, the wildcard in the message relation key 10c is considered as matching with the disk-utilisation value "75" of the message key 10b'. Owing to the positive determination of the matching test, the message with the message key 10b' is discarded from display. In contrast, another message 10b" is also shown which does not match with the message relation key 10c (since it refers to node "frankv" rather than "trex"). Since the matching is determined to be negative in this case, the message with the message key 10b" is not discarded from display.

FIG. 5a shows what is displayed by the message browser 13 before the comparison of FIG. 4 is carried out. The display shows two message keys which indicate that the disk utilisation is 75% on node trex and 95% on node frankv. After the comparison in FIG. 4 has been carried out, the first-mentioned message key has been replaced by the present message key 10b which indicates that the disk utilisation on node trex is 95%. Thus, the outdated message 10b' is no longer displayed as soon as a more recent message is received from the corresponding agent 4.

Figure 6:
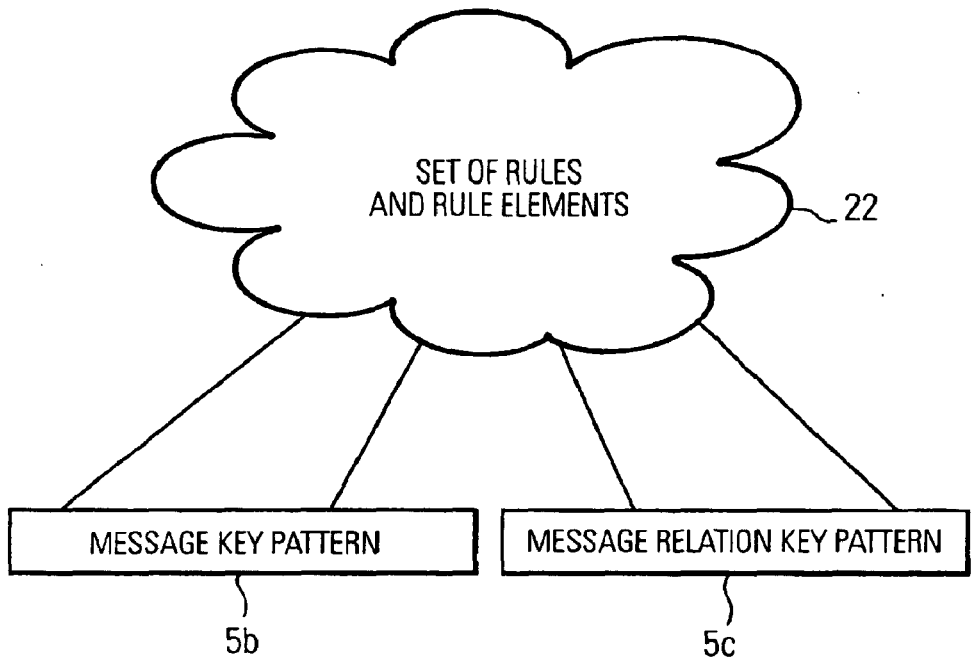
FIG. 6 illustrates the common usage of rules for message key patterns and message relation key patterns.

As already indicated in FIGS. 3 and 4, the message key patterns and the message relation key patterns use the same rule definition syntax. This is further illustrated by FIG. 6 which shows that both message key patterns 5b and message relation key patterns 5c are defined on the basis of the same set 22 of rules and rule elements. This fact is very advantageous since it discharges the user from the need to learn and use two different rule definition languages and, thereby, facilitates the set-up procedure and operation of the monitoring system.

Figure 7:
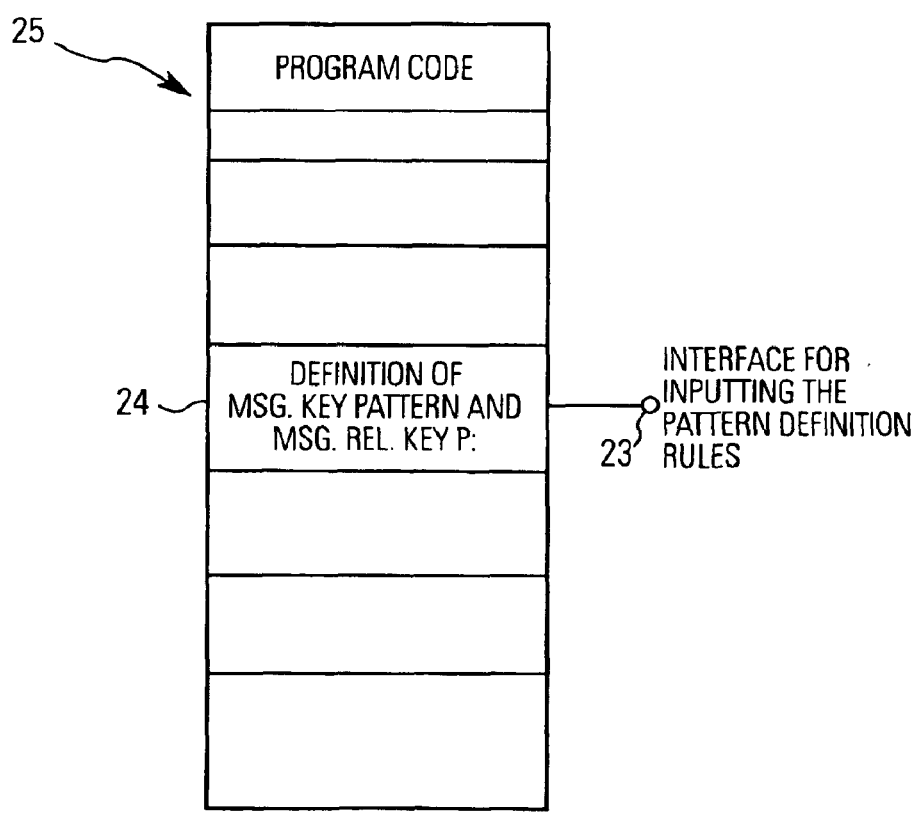
FIG. 7 illustrates that the message key pattern and the message relation key pattern are defined at a common place in a computer program.

Owing to the fact that both the message key and the message relation key are generated in response to the occurrence of an event by one and the same agent, and that both are based on the same rule definition syntax, the message key pattern 5b and the message relation key pattern 5c can be defined by a user via a common user interface 23 at a common place 24 of a monitoring computer program 25, as is illustrated in FIG. 7. The "common place" may be, for example, a common class or routine of the program.

Figure 8:
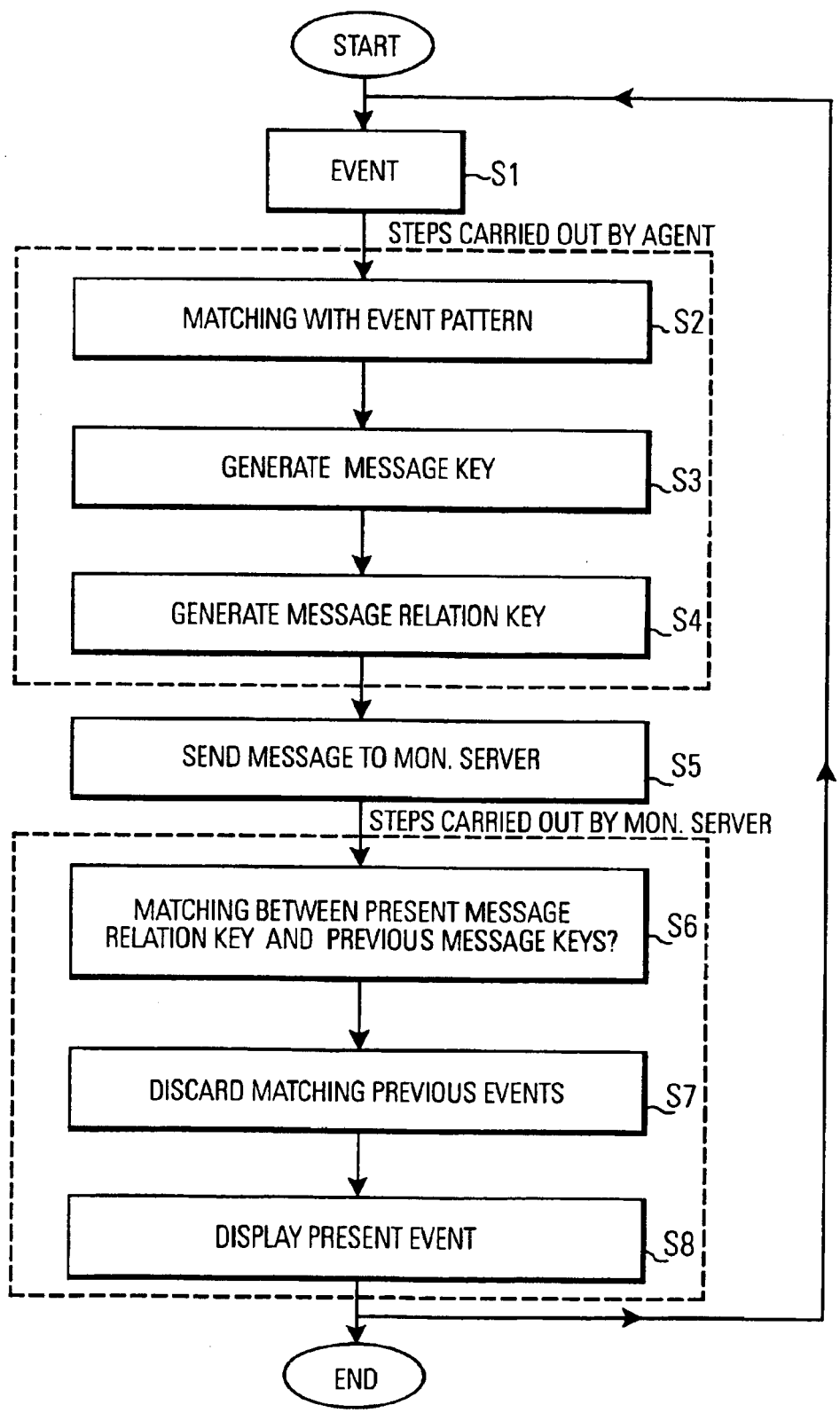
FIG. 8 is a flow-chart of a message correlation process carried out by an agent and a monitoring server.

FIG. 8 illustrates the message correlation method carried out by the agents 4 and the monitoring server 9. In step S1 an event occurs. In step S2 the agent 4 ascertains whether the event matches with one of the event patterns 5a comprised in the rules 5. If the answer is positive, in step S3 a message key 10b is generated according to the corresponding message key pattern 5b. If the rules 5 comprise also a message relation key pattern 5c, in step S4 a message relation key 10c is generated, according to the message relation key pattern 5c. The steps S2 to S4 are carried out by the agent associated with the monitored node 2 on which the event occurred. Then, in step S5, the message 8 with the message key pattern 5b and the message relation key pattern 5c is sent to the monitoring server 9. In step S6 the monitoring server 9 ascertains whether the message relation key 10c matches with the message keys 10b of the previous messages. If it finds a matching previous message it discards it in step S7 from display in the message browser 13. In step S8 the monitoring server 9 initiates the display of the present message 8 in the message browser 13 so that it appears as if the matching previous message were replaced by the present message 8. The steps S6 to S8 are carried out by the monitoring server 9 in conjunction with the message browser 13. As soon as another event occurs, the sequence of steps S1 to S8 is carried out again, thus forming a quasi-endless loop.

Thus, a general purpose of the disclosed embodiments is to provide an improved method, computer system and computer program product for monitoring services in an IT network. In particular, the disclosed embodiments enable a definition of the correlation analysis by the user. The computing and database access resources needed for the correlation analysis are reduced. A correlation of messages is even then possible if the available messages do not contain the full information required for a correlation check. Thus, the disclosed embodiments allow an easier suppression of identical or related events.

All publications and existing systems mentioned in this specification are herein incorporated by reference.

Although certain systems, methods and products constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. A computer-implemented method for monitoring objects within an information technological (IT) network having monitored nodes in which monitoring-relevant events occur, comprising:
   generating event-related messages comprising a message key and a message relation key, wherein each event-related message is generated in response to a single monitoring-relevant event occurring on a monitored node by a monitoring agent running on the monitored node;
   comparing the message relation key with the message key of another message;
   processing the other message depending on the result of the comparison.

2. The method of claim 1, wherein the message key has attributes which characterise certain characteristics of the related event which are relevant for monitoring purposes.

3. The method of claim 1, wherein the message relation key has attributes, at least one of the attributes being an attribute of the message key or comprising a wildcard.

4. The method of claim 1, wherein the step of comparing the message relation key and the other message key comprises checking whether the keys match with each other.

5. The method of claim 1, wherein the step of processing comprises discarding the other message if its message key is found to match with the message relation key.

6. The method of claim 1, further comprising: a monitoring server which receives the messages and carries out the processing step.

7. The method of claim 1, wherein the message key and the message relation key are generated according to key patterns which can be defined on the basis of a set of pattern definition rules, and wherein both the message key pattern and the message relation key pattern are defined on the basis of the same set of pattern definition rules.

8. The method of claim 7, wherein the method is carried out by a computer program, and the message key pattern and the message relation key pattern can be defined by a user via a user interface at a common place of the computer program.

9. A system for monitoring objects within an information technological (IT) network having monitored nodes in which monitoring-relevant event occur and a message processor,
   monitoring agents run on the monitored nodes and generate event-related messages in response to monitoring-relevant events occurring on the monitored nodes comprising a message key and a message relation key, each event-related message being generated in response to a single monitoring-relevant event; and
   wherein the message processor compares the message relation key with the message key of another message and processes the other message depending on the result of the comparison.

10. The system of claim 9, wherein the agents generate messages with message keys having attributes which characterise certain characteristics of the related event which are relevant for monitoring purposes.

11. The system of claim 9, wherein the agents generate messages with the message relation key having attributes, at least one of the attributes being an attribute of the message key or comprising a wildcard.

12. The system of claim 9, wherein the monitoring server compares the message relation key and the other message key by checking whether the keys match with each other.

13. The system of claim 9, further comprising: a monitoring server which processes the other message by discarding it if it has found the other message's message key to match with the message relation key.

14. The system of claim 9, wherein the agent generates the message key and the message relation key according to key patterns which are both defined on the basis of the same set of pattern definition rules.

15. The system of claim 14, wherein the system comprises a monitoring computer program baying a user interface, and the message key pattern and the message relation key pattern can be defined by a user via the user interface at a common place of the computer program.

16. A computer program product including program code for execution on a network having monitored nodes in which monitoring-relevant events occur, said program code comprising:
   a monitoring agent portion for generating event-related messages comprising a message key and a message relation key, wherein each event-related message is generated in response to a single monitoring-relevant event occurring on a monitored node by the monitoring agent portion running on the monitored node; and
   a monitoring server portion for comparing the message relation key with the message key of another message and processing the other message depending on the result of the comparison.

17. The computer program product of claim 16, wherein the message key has attributes which characterise certain characteristics of the related event which are relevant for monitoring purposes.

18. The computer program product of claim 16, wherein the message relation key has attributes, at least one of the attributes being an attribute of the message key or comprising a wildcard.

19. The computer program product of claim 16, wherein the step of comparing the message relation key and the other message key comprises checking whether the keys match with each other.

20. The computer program product of claim 16, wherein the step of processing comprises discarding the other message if its message key is found to match with the message relation key.

21. A computer program product including program code for execution on a network having monitored nodes in which monitoring-relevant events occur, said program code comprising:

an agent portion that runs on each monitored node and generates event-related messages comprising a message key and a message relation key, each event-related message being generated in response to a single monitoring-relevant event occurring on the monitored node; and another portion that compares the generated message relation key with the message key of another message, wherein the message key and the message relation key are generated according to key patterns which can be defined on the basis of a set of pattern definition rules.

22. The computer program product of claim 21, wherein the message key pattern and the message relation key pattern can be defined by a user via a user interface at a common place of the computer program.

23. The computer program product of claim 21, wherein both the message key pattern and the message relation key pattern are defined on the basis of the same set of pattern definition rules.

* * * * *